Feb. 14, 1961 — N. F. ANDREWS — 2,971,590
MOUNTING AND DISMOUNTING MEANS FOR TRACTOR-ASSOCIATED IMPLEMENTS
Filed Sept. 22, 1958
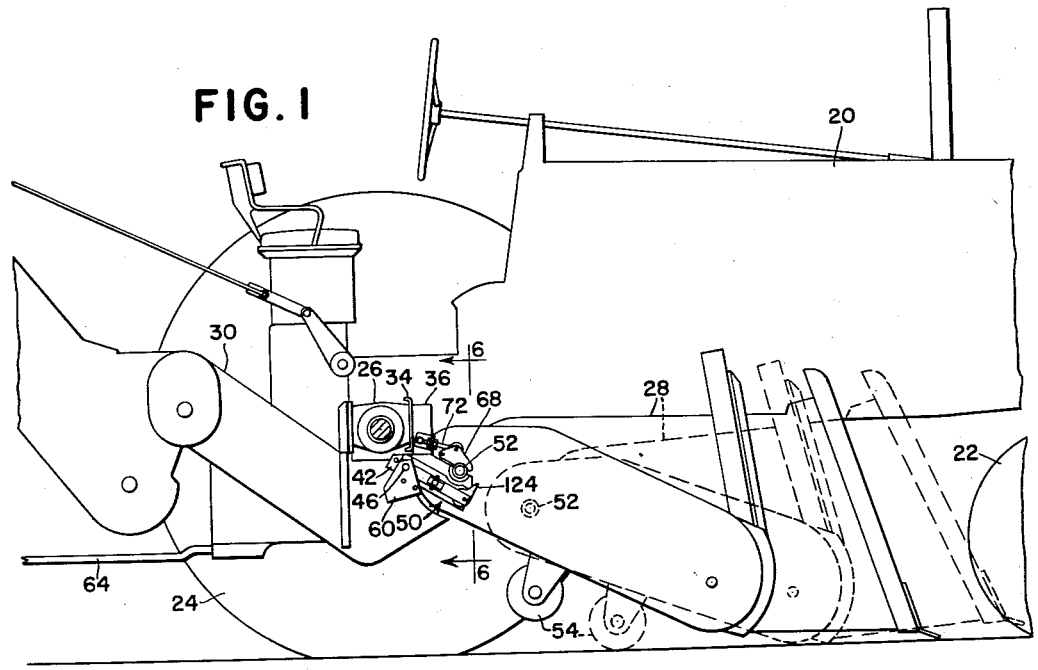
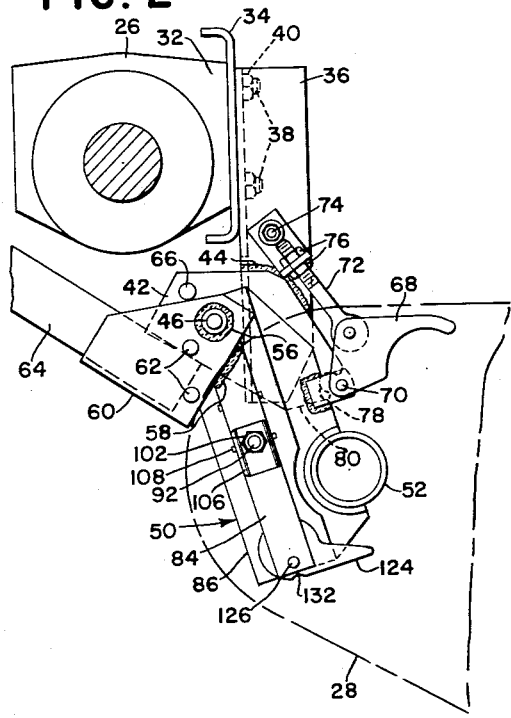
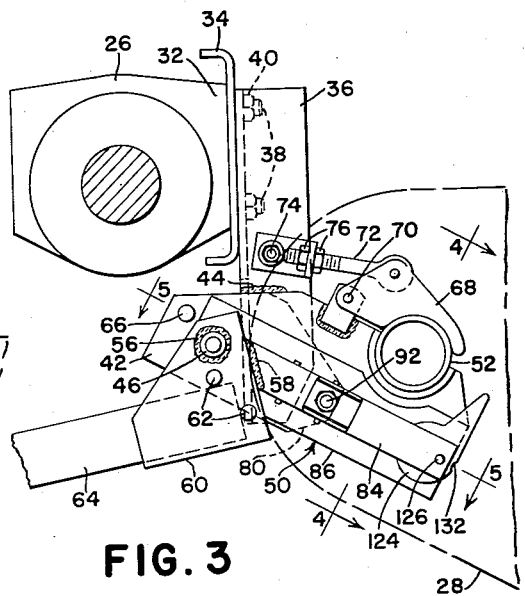
INVENTOR.
N. F. ANDREWS

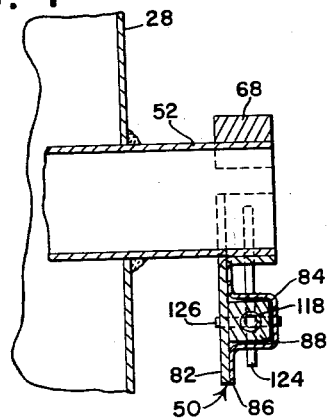
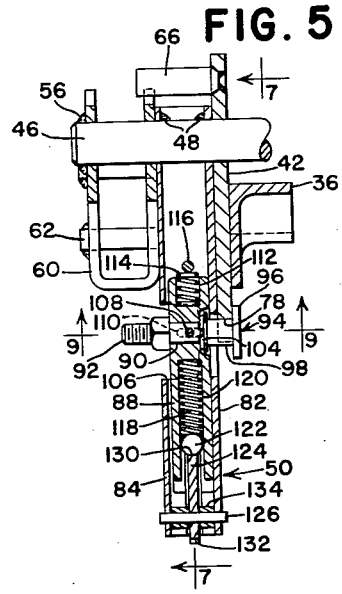
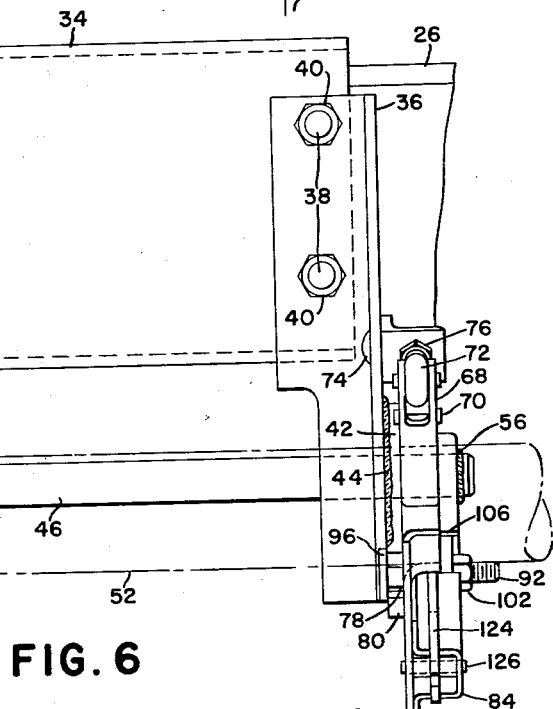

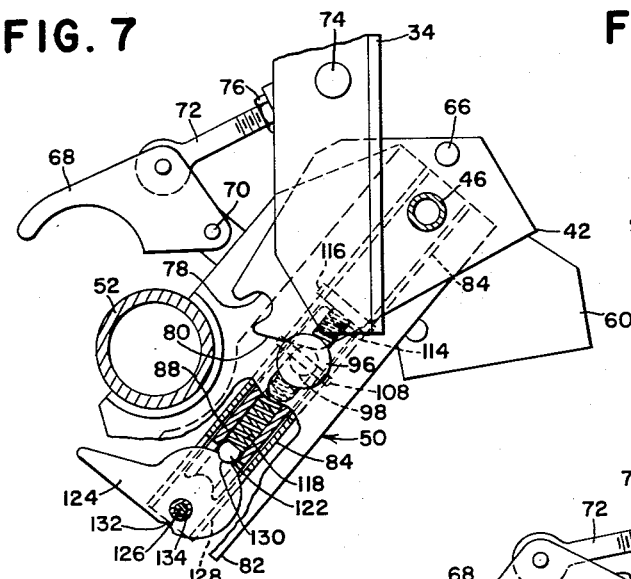
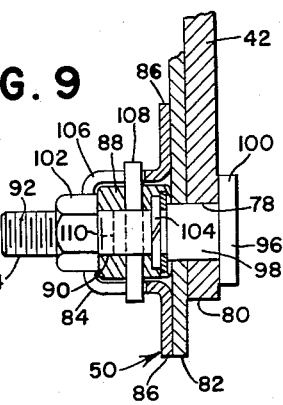
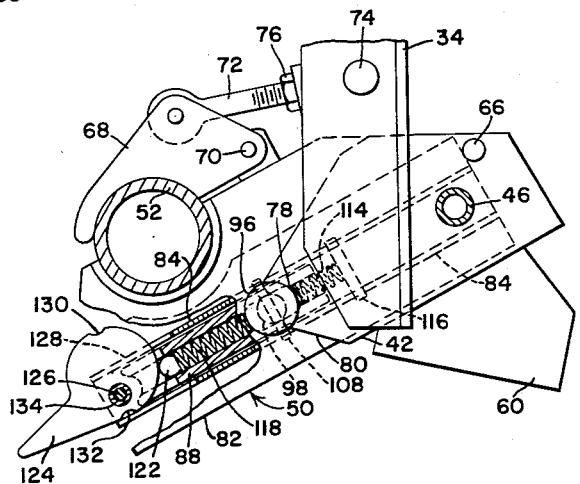
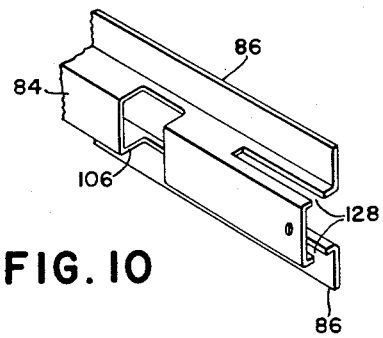

United States Patent Office 2,971,590
Patented Feb. 14, 1961

2,971,590

MOUNTING AND DISMOUNTING MEANS FOR TRACTOR-ASSOCIATED IMPLEMENTS

Norman F. Andrews, Des Moines, Iowa, assignor to Deere & Company, Moline, Ill., a corporation of Delaware Filed Sept. 22, 1958, Ser. No. 762,628

17 Claims. (Cl. 172—273)

This invention relates to tractor and implement units and more particularly to means for mounting and dismounting the implement relative to the tractor.

It is common in the agricultural field to employ a tractor with one or more so-called integral or mounted implements, in which all or a major portion of the weight of the implement is supported on the tractor. This is particularly true in the row-crop implement, such as the corn picker, cotton harvester and so forth, wherein the tractor, having a relatively wide transverse rear axle and a relatively narrow longitudinal body, carries at one or both sides thereof a row unit operating between the body and the associated rear wheel, the forward end of the body being normally supported on a single wheel or a pair of closely spaced wheels, thus constituting a tricycle mobile support. Implements of this character are generally of considerable weight and the mounting and dismounting thereof is facilitated by means involving not only attaching structure but also elevating and lowering structure. The removability of the implement is desirable from the standpoint of releasing the tractor for use with other implements.

Broadly, the mounting and dismounting of implements relative to tractors by means employing jacking devices and equivalent structures is not new, and many prior art examples will be found, typical of which is that forming the subject matter of the U.S. patent to Andrews 2,347,871. However, the development of different types of tractors and modifications in implements have indicated the need for improvement in mounting and dismounting structure, or at least the adaptability thereof to the improvements in implements and tractors. And, accordingly, the present invention has for its general object the provision of such improved mechanism.

It is an important object of the invention to provide a mounting and dismounting structure in which the jacking and mounting function is accompanied by an automatic lock which retains the implement, at least temporarily, in place on the tractor, pending the establishment of further and more positive locking means. In this respect, it is a specific feature to provide a releasable retaining means including a locking element acted upon at opposite sides by opposed springs, one of which can be preloaded to achieve the automatic locking function and which can be released so as to permit the other spring to dominate whereby the lock will be instantly released to facilitate removal of the implement from the tractor. It is a further object to provide mounting and dismounting means including a pair of complementary jaws interconnected to operate in unison so that as one jaw, which is employed as a lifting as well as a mounting jaw, moves to its mounting position it automatically incurs closing of the other jaw so that the two jaws in effect clamp about an engageable part on the implement. Further features of the invention reside in the adaptability of a mounting and dismounting structure to tractors of existing construction, a simple and economic design, and a structure that may be readily manually operated by the employment of readily available force-applying means.

The foregoing and other important objects and desirable features inherent in and encompassed by the invention will become apparent to those versed in the art as a preferred embodiment of the invention is disclosed, by way of example, in the ensuing description and accompanying sheets of drawings, the several figures of which are described immediately below.

Fig. 1 is a side elevational view, partly schematic and partly broken away, showing in full lines a tractor-mounted cotton harvester and in broken lines the relationship of the dismounted harvester to the tractor.

Fig. 2 is a fragmentary view on an enlarged scale showing the condition of the harvester relative to the tractor just prior to mounting thereof on the tractor.

Fig. 3 is a similar view showing completion of the mounting stage.

Fig. 4 is an enlarged transverse section on the line 4—4 of Fig. 3.

Fig. 5 is an enlarged longitudinal section on the line 5—5 of Fig. 3.

Fig. 6 is an enlarged front view, with portions omitted, as seen generally along the line 6—6 of Fig. 1.

Fig. 7 is a side elevational view, partly in section, as seen generally along the line 7—7 of Fig. 5, and showing the clamping jaws in a stage prior to closing thereof.

Fig. 8 is a similar view and shows the jaws in a stage just prior to opening thereof.

Fig. 9 is an enlarged section on the line 9—9 of Fig. 5.

Fig. 10 is a fragmentary perspective, on an enlarged scale, of the tubular means on the lifting jaw.

The environment in which the invention is illustrated embodies a tractor mounted cotton harvester of the general nature forming the subject matter of the U.S. patent to Roscoe 2,662,360; although the principles of the invention have, of course, wider application. Those familiar with the general environmental structure referred to will recognize at 20 a typical agricultural tractor supported on a front wheeled truck 22 and a pair of laterally spaced apart rear traction wheels 24, only one of which appears in the drawing. The rear portion of the tractor body includes a relatively wide transverse rear axle structure 26 which not only mounts the rear portion of the tractor body but serves, in its lateral extent, as means for mounting a variety of implements on the tractor, all as well known to those versed in the art. In the present case, the mounting arrangement thus afforded provides for the mounting of a row unit 28 on a cotton harvester of the type disclosed in the above noted Roscoe patent. The axle structure further carries rearwardly thereof conveying and elevating structure 30, complementary to the row unit 28 but the details of which may be ignored in this instance.

As best shown in Figs. 2 and 3 the axle structure 26 affords at least a front mounting pad 32 on which is rigidly secured a mounting plate 34 having a depending bracket or support 36, axle-structure-carried studs 38 and nuts 40 being typically used to establish the connection. As best shown in Fig. 6, the plate 34 has a relatively substantial length and is disposed across the front of the axle 26 to give the mounting structure a fairly extensive width, there being two depending supports or brackets 36 which respectively have fore-and-aft lower plates 42 rigidly secured thereto as by welding at 44.

The side plates 42 are spanned by and journal a transverse pivot member 46 which affords the basic pivot for the mounting and dismounting structure, and this pivot member has rigidly secured to opposite ends thereof, as by welding at 48, a pair of work members, each in the form of a lever or lower jaw 50. In some instances, it may be possible to dispense with one of the jaws, relying upon only one to act on the implement, here the harvester row unit 28, which has an engageable part in the form of a transverse pipe 52 with which the jaws 50 cooperate to raise the row unit to mounted position and to lower the row unit to dismounted position. The fact that the pipe 52 may extend completely through the unit may be considered immaterial, since it may be used to carry internal harvesting structure, not significant here. When the row unit is dismounted (dotted lines, Fig. 1) it may be supported in part by an underportion thereof and in part by a transport or temporary support wheel 54. When the row unit is mounted (full lines, Fig. 1) the major part of the unit is supported on the tractor via the mounting structure, which includes the lever or jaw 50, and other structure to be described, all of which transmits the weight of the implement or unit to the tractor axle structure 26.

Rigidly secured to the basic pivot 46, as by welding at 56, and also welded as at 58 to the outer jaw or lever 50, is socket means afforded by a U-shaped member 60 which carries a pair of transverse studs 62 and which is open at its rear end to receive a forwardly insertable force-applying means such as a bar 64 for enabling the application of mechanical force to the lever. In the present case, the bar 64 is the wagon hitch for the tractor, or, more properly the tractor drawbar. Any other suitable force-applying tool or bar could be used. From the description thus far it will be seen that the outermost or right hand lever 50 and associated socket 60 are rigidly secured together and rigidly secured also to the transverse basic pivot 46 and therefore constitute an integral bell crank, one arm of which is the lever or lower jaw 50 and the other is the socket means 60 as augmented by the force-applying bar 64. This bell crank or work means is thus rockable about the axis of the pivot 46 between the position of Fig. 2 and that of Fig. 3. A stud 66 serves as a stop to limit movement of the lever 50 and associated socket means 60 to the Fig. 2 position.

With the implement supported in its dotted line position as shown in Fig. 1 and with the lever or jaw means 50 in its depending status as shown in Fig. 2, the tractor can be driven forwardly and the lever will engage beneath and rearwardly of the implement unit engageable part or pipe 52. Thereafter, the application of manual force to rock the means 50 about the pivot 46 will elevate the rear portion of the implement to the full line position and will simultaneously operate to close an upper jaw 68 which is pivoted at 70 to the lower jaw or lever 50 and which is connected by a link 72 to a pivot point 74 on the associated support 36. The general result is a clamping of the implement support pipe 52 between the two jaws, from which it cannot escape upwardly, downwardly, forwardly or rearwardly as long as the two jaws remain in position. The effectiveness of the clamping action can be adjusted by means of a threaded portion and a pair of nuts 76 on the link 72. In order to effectuate the arrangement as a supporting structure in addition to a mounting structure, it remains only to releasably retain the lever or jaw means 50 in its Fig. 3 position. This is accomplished by the structure and in the manner to be described below.

Each support plate 42, which has been previously described as an integral or rigid part of the depending support 34, has therein a forwardly facing notch 78, and the underportion of the plate is shaped to afford a cam edge 80 that leads upwardly and forwardly to the notch 78.

Each lower jaw or lever member 50 is a composite structure, made up of an inner fore-and-aft upright plate 82 to which is rigidly attached a member of channel or U-shaped section, at 84, this member having opposite vertically turned flanges 86 by means of which the tubular member 84 may be rigidly secured, as by spot welding, to the plate 82. The member 84 thus gives each jaw 50 a tubular shape, the length of the tubular portion being generally coextensive with the length of the jaw. This tubular portion houses a retainer or lock in the form of a follower block 88, and this block is slidable fore-and-aft in the tubular portion. The block has a transverse aperture 90 therethrough which receives a shank 92 of a stud 94 which has a shouldered head 96 projecting outwardly adjacent the associated plate 42. The shouldered head has a cylindrical portion 98 which is adapted to ride the cam edge 80 of the plate 42 and which is receivable in the notch 78. The head further includes an annular radially flanged portion 100 which abuts the associated side of the plate 42. A nut 102 on the shank 92 may be tightened to effect a clamping action between the jaw 50 and the plate 42. The block 88 is recessed to accommodate a spring lock washer 104 (Fig. 9) and this washer, when the nut 102 is loosened, serves to relax the clamping relationship between the head 96 and the plate 42. During mounting and dismounting of the implement, the nut 102 will be loosened.

Since the block 88 is slidable fore-and-aft in the tubular member 84 and since the shank 92 and nut 102 project at the outer side of that member, the member is cut away at 106 to accommodate the nut. The cutout additionally accommodates fore-and-aft movement of a vertical pin 108 which has a force fit in the block 88 and which extends through the intermediate portion of the stud 94 via a slot 110 in the stud. The purpose of the pin 108 is to hold the stud against turning when the nut 102 is loosened and tightened. The slot 110 permits axial movement of the stud relative to the block 88. The pin 108 must be inserted through the block 88 and stud 94 after assembly of the block 88 within the tubular portion 84, for obvious reasons.

The block 88 is drilled or bored at its rear end at 112 to receive biasing means in the form of a spring 114 which acts against an internal portion of the block and reacts against a pin 116 rigid in the tubular portion 84 behind the block 88. The spring 112 thus urges the block 88 in a forward direction, or in a direction tending to disengage the stud cylinder 98 from the notch 78 in the plate 42. Acting in opposition to the spring 112 is a second spring 118 which is received in a bore 120 in the opposite axial end of the block 88. This spring abuts at one end against the interior of the block and carries at its other end a detent ball 122 which works in conjunction with a bi-positionable cam or selective means 124, pivoted at 126 to the extreme forward end of the tubular portion and working in a vertical slot 128 in the tubular portion. The selective means 124 is best shown in Figs. 7 and 8 as comprising a cam shaped member having diametrically opposed notches 130 and 132, respectively relatively close to and relatively far from the pivot 126. When the means or member 124 is in the position shown in Fig. 7, the detent means effected by the ball 122 and notch 130 retains the position of the member and the spring 118 is compressed. When the member 124 is turned to its released position, counterclockwise beyond its Fig. 8 position, the ball 122 engages the closer notch 132 and therefore the spring 118 is unloaded. When the spring 118 is compressed or loaded (Fig. 7) it may have a pressure of approximately twenty-five pounds as compared to a ten-pound load on the spring 114. Thus, the spring 118 will dominate the spring 114 and will urge the follower block 88 and its associated stud 92 rearwardly, whereby the stud will follow the cam edge 80 and, when the jaw means 50 is swung upwardly and forwardly, the stud cylinder 98 will ride the cam edge 80 until the mounting position of the jaw means is attained, at which time the stud will snap into the plate notch 78, thus retaining the jaw in its mounting or raised position. In view of the leverage and mechanical advantages obtained, plus the load on the compressed spring 118, the jaw means cannot be displaced downwardly until the selective means 124 is turned past its Fig. 8 position, removing the load from the spring 118 and allowing the spring 114 to dominate the situation, whereby the block is urged forwardly by the spring 114 to effect automatic disengagement of the stud from the plate notch 78 and allowing lowering of the jaw means 50.

The pivot pin 126 for the selective means 124 carries a pair of bushings 134 which serve as stop means to limit forward movement of the block 88.

In the use of the mechanism, the mobile supporting frame, as represented by the tractor, is moved into position proximate to the dismounted implement, which is supported in its dotted line position as shown in Fig. 1. The work member or lower jaw means depends from the frame in the starting position shown in Fig. 2, and is thus engageable with the engageable part or pipe 52 on the implement 28. The jaw means or work member 50 is then swung to its mounting position (Fig. 3) to elevate the implement from dismounted position to mounted position. At the same time, the upper jaw 68 closes, because of its connection in responsiveness to the lower jaw. The initially released retaining means, represented by the follower block 88 and its stud 92 as disengaged from the notch 78, is operative automatically in response to swinging of the lower jaw 50 to its mounting position to lock the jaw and retain that position. This occurs because as the lower jaw swings forwardly the stud rides the cam edge 80 on the plate 42 and ultimately the stud snaps into the notch 78 under pressure of the loaded spring 118, the selective means 124 being in its Fig. 7 position (see also Figs. 2 and 3). Since the two jaws 50 and 68 are interconnected by the linkage and the linkage reacts against the support 34, movement of the lower jaw to its mounting position will incur movement of the upper jaw to its clamping position, and retention of the lower jaw in its mounting position will necessarily incur retention of the upper jaw in its clamping position. If desired, the nuts 102 on the studs 94 may be tightened to further augment the security of the structure as a mounting and supporting means.

When it is desired to dismount the implement, the nuts 102 are first loosened to relax the clamping effect of the stud heads on the plates 42. The selective means is then swung to a position diametrically opposed to that of Fig. 7 so as to remove the load on the spring 118, whereupon the opposing spring 114 becomes dominant and shifts the associated stud out of engagement with the notch 78. As the lower jaw 50 swings downwardly to its starting position, as stopped by the stud 66 on the plate 42, the upper jaw 68 simultaneously opens, and the tractor may be backed away from the ground-supported implement.

The structure is thus more than adequate to serve the dual function of mounting the implement and supporting the implement in its mounted position. In addition, it has the function of lowering the implement to its dismounted position and at the same time is conditioned by such action to release the tractor from the implement for driving of the tractor rearwardly. It will be understood, of course, that such expressions as "front," "rear," "left," right," etc., are used here with reference to the preferred embodiment of the invention and accordingly are words of convenience and not of limitation. Moreover, the preferred structure is that deemed to produce satisfactory results, but various modifications and alterations may be made therein, without departing from the spirit and scope of the invention.

What is claimed is:

1. Mechanism cooperative between a supporting frame and an associated dismounted implement for shifting the implement to a mounted position relative to the frame, comprising: a work member movable on the frame from a starting position proximate to and engaging the implement to a mounting position for effecting shifting of the dismounted implement to its mounted position; and initially released retaining means operative responsive to shifting of the member to its mounting position to lock said member in said mounting position, said retaining means including an element on the frame and a cooperative element on the member, one of said elements having a notch therein and a cam portion leading to said notch and the other element having a lock initially out of the notch and adapted to follow the cam portion, a first spring on said other element biasing the lock to follow the cam portion and to enter the notch, a second spring on said other element opposing the first spring and acting on the lock, and selective means for loading the first spring to overcome the second spring so that upon movement of the member to its mounting position the lock will automatically enter and remain in the notch and said selective means being operative in the mounting position of the member to unload the first spring so that the second spring is effective to automatically move the lock out of the notch whereby the member is returnable to its starting position.

2. The invention defined in claim 1, including: engaging means movable on the frame for engaging the implement in its mounted position; and means interconnecting the member and said engaging means for moving the latter toward the implement as the member is moved to its mounting position and away from the implement as said member is returned to its starting position.

3. The invention defined in claim 2, in which: the member and the engaging means are respectively lower and upper cooperative jaws respectively engageable with the implement from below and above.

4. The invention defined in claim 3, in which: the lower jaw is a lever pivoted on the frame and movable upwardly to the mounting position, the upper jaw is a lever pivoted on the frame parallel to the lower jaw pivot and movable downwardly from a starting position, and the means interconnecting the two is a link causing downward closing movement of the upper jaw as the lower jaw moves upwardly and upward opening movement of said upper jaw as the lower jaw moves downwardly.

5. The invention defined in claim 1, in which: the retaining means further includes a tubular portion opening to the notch and cam portion, the lock is shiftable lengthwise of said tubular portion, and the springs are contained in said tubular portion respectively at opposite sides of the lock.

6. The invention defined in claim 5, in which: the selective means is a bi-positionable part carried by the tubular portion and acting on the first spring to load and unload said first spring as aforesaid.

7. The invention defined in claim 6, including: detent means activated by the first spring and operative to retain said part in either of its two positions.

8. Mechanism cooperative between a supporting frame and an associated dismounted implement for shifting the implement to a mounted position relative to the frame, comprising: a lower jaw pivoted on the frame and depending toward and engageable with the implement for upward swinging to a mounting position to elevate the implement from its dismounted position; an upper jaw pivoted on the frame in cooperative relation to the lower jaw; and means interconnecting the jaws for moving the upper jaw downwardly into engagement with the implement as the lower jaw elevates the implement to its mounted position.

9. The invention defined in claim 8, including: lock means mounted on one of said jaws operative automatically in response to attainment by the implement of said mounting position for locking at least one of the jaws in its implement engaging condition.

10. Mechanism cooperative between a supporting frame and an associated dismounted implement for shifting the implement to a mounted position relative to the frame, comprising: a lower jaw pivoted on the frame and depending toward and engageable with the implement for upward swinging to a mounting position to elevate the implement from its dismounted position; means on said jaw affording a socket receivable of a force-applying means for swinging said jaw upwardly to lift the implement to its mounted position; means supported on the frame for releasably retaining said jaw in its upwardly swing condition and an upper member on the frame cooperative with said lower jaw to engage the implement as the lower jaw elevates the implement to retain the implement in its mounted position.

11. The invention defined in claim 10, including: an upper jaw pivoted on the frame in cooperative relation to the lower jaw; and means interconnecting the jaws for moving the upper jaw downwardly into engagement with the implement as the lower jaw elevates the implement to its mounted position.

12. Mechanism cooperative between a supporting frame and an associated dismounted implement for shifting the implement to a mounted position relative to the frame, comprising: a lower jaw pivoted on the frame and depending toward and engageable with the implement for upward swinging to a mounting position to elevate the implement from its dismounted position; means on said jaw affording a socket; force-applying means removably insertable in said socket for swinging said jaw upwardly to lift the implement to its mounted position; means supported on the frame for releasably retaining said jaw in its upwardly swung condition and an upper member on the frame cooperative with said lower jaw to engage the implement as the lower jaw elevates the implement to retain the implement in its mounted position.

13. The invention defined in claim 1, including: additional means cooperative between the member and the frame-carried element for securing the former to the latter in the mounted position of the implement.

14. Mechanism cooperative between a supporting frame and an associated dismounted implement for shifting the implement to a mounted position relative to the frame, comprising: a lever pivoted to the frame for swinging in an upright plane and having an initial position projecting toward and engageable with the implement for swinging upward to a mounting position to raise the implement to its mounted position; a plate rigid on the frame alongside the lever and having a notch therein and a cam edge leading upwardly to said notch; tubular means rigid on and extending radially of the lever and having a laterally opening slot lengthwise thereof and exposed to the notch and cam edge; a follower slidable lengthwise of the tubular means and having a portion projecting through said slot to ride said cam edge and engageable in the notch; a first spring in said tubular means and engaging the follower from one end for urging said follower portion to ride said edge and to condition said follower portion to enter the notch; a second spring in the tubular means and engaging the follower from the other end to bias said follower portion away from said notch; and selective means carried by the tubular means and acting on the first spring to load said first spring so as to dominate the second spring so that when the lever is swung to its mounting position the follower portion enters the notch to lock the lever in said mounting position, said selective means being changeable in the mounting position of the lever to unload said first spring to cause the second spring to dominate the first whereby to cause the follower portion to leave the notch so as to release the lever for return to its starting position.

15. The invention defined in claim 14 in which: the follower is a block having an aperture therethrough transverse to the length of the tubular means, a stud is carried in said aperture and has a shouldered head including a first part defining the follower portion and a radial part engageable with the plate from the side, and means in cooperative relation between the follower block and stud for selectively effecting a clamping and releasing relationship between said plate and said radial head part.

16. Mechanism cooperative between a supporting frame and an associated dismounted implement for shifting the implement to a mounted position relative to the frame, comprising: a member movable on the frame in an upright plane from an initial position projecting toward and engageable with the implement to a mounting position to shift the implement to its mounted position; a plate rigid on the frame alongside the member and having a notch therein and a cam edge leading to said notch; tubular means rigid on the member and having a laterally opening slot lengthwise thereof and exposed to the notch and cam edge; a follower slidable lengthwise of the tubular means and having a portion projecting through said slot to ride said cam edge and engageable in the notch; a first spring in said tubular means and engaging the follower from one end for urging said follower portion to ride said edge and to condition said follower portion to enter the notch; a second spring in the tubular means and engaging the follower from the other end to bias said follower portion away from said notch; and selective means carried by the tubular means and acting on the first spring to load said first spring so as to dominate the second spring so that when the member is moved to its mounting position the follower portion enters the notch to lock the lever in said mounting position, said selective means being changeable in the mounting position of the lever to unload said first spring to cause the second spring to dominate the first whereby to cause the follower portion to leave the notch so as to release the member for return to its starting position.

17. The invention defined in claim 16, in which: the follower is a block having an aperture therethrough transverse to the length of the tubular means, a stud is carried in said aperture and has a shouldered head including a first part defining the follower portion and a radial part engageable with the plate from the side, and means in cooperative relation between the follower block and stud for selectively effecting a clamping and releasing relationship between said plate and said radial head part.

References Cited in the file of this patent

UNITED STATES PATENTS

| | | |
|---|---|---|
| 2,500,040 | McKahin | Mar. 7, 1950 |
| 2,576,779 | Court | Nov. 27, 1951 |